United States Patent
Gunness

(10) Patent No.: US 9,624,671 B1
(45) Date of Patent: Apr. 18, 2017

(54) LEAK DETECTION AND LOCATION SYSTEM AND METHOD

(71) Applicant: Clark Robert Gunness, Nashville, TN (US)

(72) Inventor: Clark Robert Gunness, Nashville, TN (US)

( * ) Notice: Subject to any disclaimer, the term of this patent is extended or adjusted under 35 U.S.C. 154(b) by 0 days.

(21) Appl. No.: 15/256,763

(22) Filed: Sep. 6, 2016

Related U.S. Application Data

(60) Provisional application No. 62/262,515, filed on Dec. 3, 2015.

(51) Int. Cl.
  *G01R 27/08* (2006.01)
  *E04D 13/00* (2006.01)
  *G01M 3/16* (2006.01)
  *E04G 23/02* (2006.01)

(52) U.S. Cl.
  CPC ....... *E04D 13/006* (2013.01); *E04G 23/0281* (2013.01); *G01M 3/16* (2013.01)

(58) Field of Classification Search
  CPC ..... E04D 13/006; E04G 23/0281; G01M 3/16
  USPC ....... 324/500, 512, 522, 713, 715, 718, 600, 324/649, 691, 216, 237, 238, 240, 456, 324/693–694, 71.1, 523, 705, 557, 559; 702/35–36, 50–51, 64–65; 340/539.22, 340/605; 52/301.1, 408; 73/1.17
  See application file for complete search history.

(56) References Cited

U.S. PATENT DOCUMENTS

| | | | | |
|---|---|---|---|---|
| 3,967,197 A | * | 6/1976 | Anderson | G01N 27/223 324/664 |
| 4,110,945 A | * | 9/1978 | Sheahan | E04D 11/02 200/61.05 |
| 4,404,516 A | * | 9/1983 | Johnson, Jr. | G01M 3/045 324/525 |
| 4,543,525 A | * | 9/1985 | Boryta | G01M 3/40 324/559 |
| 4,565,965 A | * | 1/1986 | Geesen | E04D 13/006 324/705 |
| 4,598,273 A | * | 7/1986 | Bryan, Jr. | E04D 13/006 200/61.04 |
| 4,947,470 A | * | 8/1990 | Darilek | G01M 3/40 324/326 |
| 5,081,422 A | * | 1/1992 | Shih | E04D 13/006 324/693 |
| 5,184,083 A | * | 2/1993 | Groover | G01N 27/205 324/357 |
| 5,288,168 A | * | 2/1994 | Spencer | E02D 31/00 324/559 |
| 5,335,536 A | * | 8/1994 | Runnevik | G01M 3/20 73/40.7 |

(Continued)

*Primary Examiner* — Patrick Assouad
*Assistant Examiner* — Sean Curtis
(74) *Attorney, Agent, or Firm* — Lawson Persson & Chisholm, PC; Catherine E. Napjus; Michael J. Persson

(57) ABSTRACT

The present invention is a method and system for detecting and locating leaks in a roofing membrane. The mean net voltage from an emitting electrode activated by and connected to the positive side of a power supply, when a conductive mesh disposed beneath the membrane is connected to the negative side of the power supply, is compared with the mean reference voltage from the emitting electrode when a reference electrode is connected to the negative side of the power supply in place of the conductive mesh. If the mean net voltage is greater than or equal to the mean reference voltage, then a leak is indicated.

23 Claims, 6 Drawing Sheets

(56) References Cited

U.S. PATENT DOCUMENTS

| | | | | |
|---|---|---|---|---|
| 5,640,096 A * | 6/1997 | Alm | G01M 3/16 | 324/557 |
| 5,661,406 A * | 8/1997 | Daily | G01M 3/16 | 324/557 |
| 5,850,144 A * | 12/1998 | Howells | E02D 31/004 | 324/557 |
| 6,021,617 A * | 2/2000 | Sheahan | E04D 13/006 | 411/381 |
| 6,056,477 A * | 5/2000 | Ueda | B09B 1/00 | 340/605 |
| 6,167,666 B1 * | 1/2001 | Kelly | E04D 13/006 | 52/302.1 |
| 6,222,373 B1 * | 4/2001 | Morrison | G01M 3/16 | 324/532 |
| 6,331,778 B1 * | 12/2001 | Daily | G01M 3/16 | 324/512 |
| 7,141,982 B2 * | 11/2006 | Fink | G01M 3/40 | 324/444 |
| 7,292,155 B2 * | 11/2007 | Vokey | E04D 13/006 | 340/602 |
| 7,554,345 B2 * | 6/2009 | Vokey | E04D 13/006 | 324/522 |
| 7,652,481 B2 * | 1/2010 | Vokey | E04D 13/006 | 324/326 |
| 7,847,560 B2 * | 12/2010 | Vokey | E04D 13/006 | 324/523 |
| 7,872,479 B2 * | 1/2011 | Lorenz | G01M 3/16 | 324/525 |
| 8,319,508 B2 * | 11/2012 | Vokey | C23F 13/02 | 324/522 |
| 8,566,051 B2 * | 10/2013 | Gunness | G01M 3/16 | 324/444 |
| 8,970,201 B2 * | 3/2015 | Durkheim | E02D 31/004 | 324/71.1 |
| 9,341,540 B2 * | 5/2016 | Gunness | G01M 3/40 | |
| 9,500,555 B2 * | 11/2016 | Collin | G01M 3/16 | |
| 2002/0028110 A1 * | 3/2002 | Rhee | G01M 3/04 | 405/129.5 |
| 2007/0024458 A1 * | 2/2007 | McGinty | G08B 21/20 | 340/605 |
| 2008/0143349 A1 * | 6/2008 | Lorenz | G01M 3/16 | 324/691 |
| 2009/0044595 A1 * | 2/2009 | Vokey | E04D 13/006 | 73/1.17 |
| 2009/0139178 A1 * | 6/2009 | Vokey | E04D 13/006 | 52/741.1 |
| 2010/0127848 A1 * | 5/2010 | Mustapha | G08B 21/20 | 340/505 |
| 2010/0141283 A1 * | 6/2010 | Vokey | C23F 13/02 | 324/705 |
| 2010/0225341 A1 * | 9/2010 | Burrows | E04D 13/006 | 324/718 |
| 2011/0178747 A1 * | 7/2011 | Gunness | E04D 13/006 | 702/65 |
| 2012/0197565 A1 * | 8/2012 | Gunness | G01M 3/16 | 702/64 |
| 2013/0037420 A1 * | 2/2013 | Funahashi | G01N 17/04 | 205/775.5 |
| 2014/0049247 A1 * | 2/2014 | Gunness | G01M 3/40 | 324/71.1 |
| 2014/0114590 A1 * | 4/2014 | Gunness | G01M 3/40 | 702/51 |
| 2014/0361796 A1 * | 12/2014 | Vokey | G01N 27/20 | 324/693 |
| 2015/0168329 A1 * | 6/2015 | Gunness | G01M 3/40 | 324/663 |
| 2015/0259923 A1 * | 9/2015 | Sleeman | E04D 11/02 | 52/173.1 |

* cited by examiner

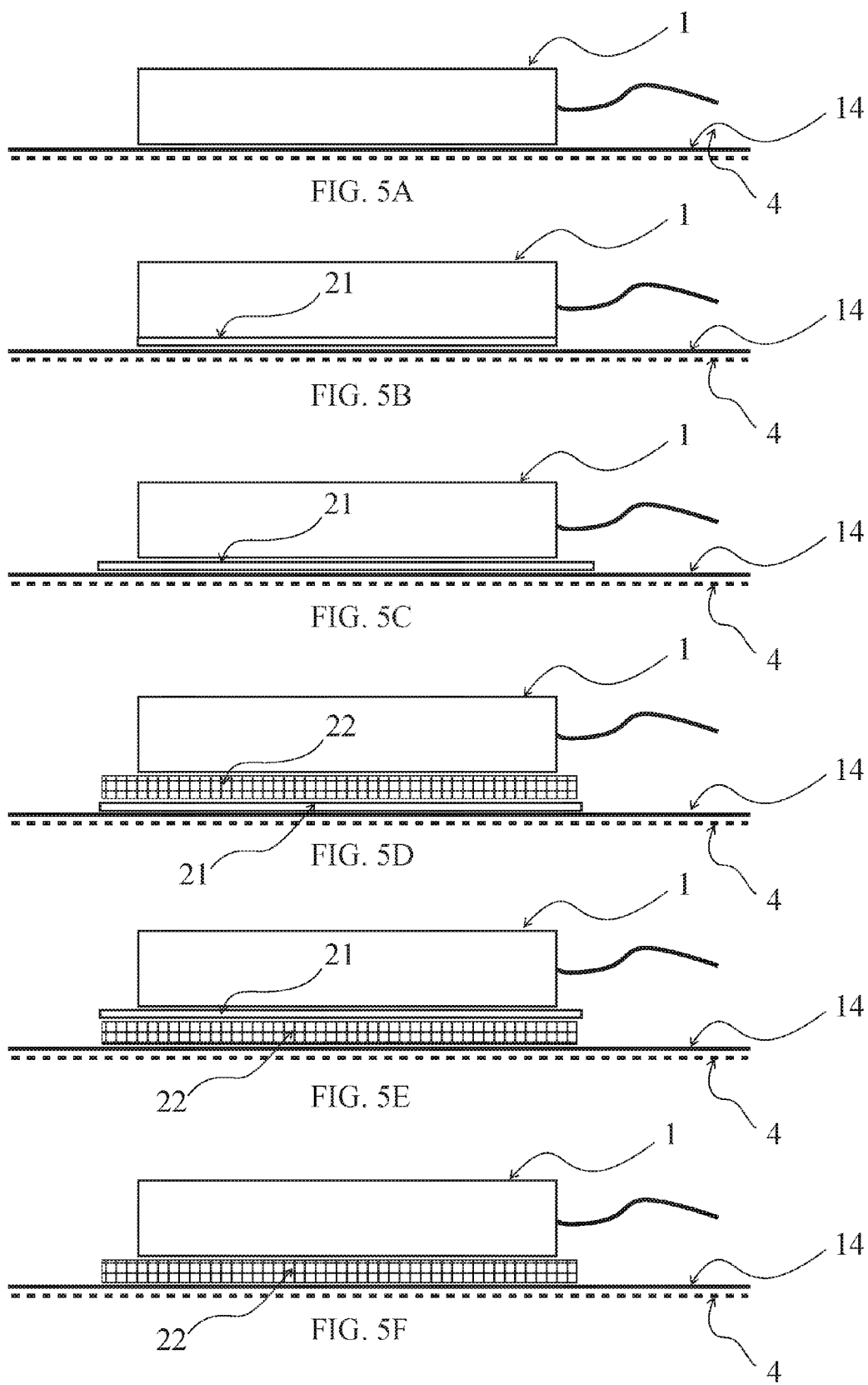

US 9,624,671 B1

LEAK DETECTION AND LOCATION SYSTEM AND METHOD

CLAIM OF PRIORITY

This application claims the benefit of priority of U.S. Provisional Patent Application Ser. No. 62/262,515, filed on Dec. 3, 2015.

FIELD OF THE INVENTION

The present invention relates to the detection and location of water leakage in structures, and in particular to computer controlled leakage detection and location methods and systems for roofs.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and electrical testing methods that not only determine if a leak is present in a membrane system, but where the leak is located.

Leakage in existing roofs is a particular problem, especially when the roof has a nonconductive element at the bottom of the roofing envelope next to the deck, such as a vapor barrier or a secondary roofing membrane. In these cases, water leaking into the roofing envelope can saturate the insulation and other elements in the envelope without actually leaking into the building because the lowermost membrane acts as a barrier to the water. In time, water might run into the building via penetrations, such as vent stacks, curbs for mechanical equipment, conduits, etc., through the roofing envelope and be visible from underneath. By this time, corrective action may be as extensive as cutting cores in the roofing envelope to determine the extent of water damage, removing a large portion of the roof; performing infrared or other tests to indicate the current status of the roofing envelope; etc.

Additionally, when the roofing envelope becomes saturated with water, a portion of the planned energy efficiency from the roofing envelope is lost. The building structure may also experience the corrosive effects of water, therefore compromising its penetrations. Unbeknownst to anyone, this process is occurring in thousands of roofs across North America and, indeed, in the built environment anywhere in the world.

There are methods that have been developed to address the above described problems including manual methods, such as capacitance testing, infrared scanning, and moisture probing. In addition, there are automatic systems driven by computers with sensors built into or retrofitted into the non-conductive insulation and other non-conductive materials which comprise the roofing envelope.

One known method of placing such an automatic system into a non-conductive envelope is to install relative humidity sensors in the roofing envelope, where the sensors measure humidity and temperature. An array of such sensors can give a representation of moisture conditions in a roofing envelope. Such a system is provided by Progeo GmbH of Germany and other vendors, and these systems have been used on projects in the United States. Such systems are limited in that the sensors require a certain amount of free air around them in order to determine the ambient moisture content of any part of the roofing envelope, and each sensor is only one point, measuring the relative humidity of a very small area around its location. Further, there is no guarantee that any air will circulate in the roofing envelope, and if the free flow of air is cut off, especially given the impermeable nature of closed-cell insulations in today's roofing envelopes, the sensors will not be able to sense variations in moisture, but only temperature changes.

In addition, the Inventor has developed several automatic systems, such as those disclosed in U.S. Pat. Nos. 8,566,051 and 9,341,540 and co-pending U.S. patent application Ser. Nos. 13/442,586, 14/061,480, and 14/107,694, and U.S. Provisional Application No. 62/237,948, each of which is hereby incorporated by reference.

Another known automatic system requires a grid of hydrophobic cables, the cross-over points of which, when wetted from water flowing through the roofing membrane, make a closed circuit that identifies which portion of the grid is wet and allows location of the leakage through the membrane. This system requires water to make its way to the cross-over points to trigger an alarm and a significant flooding of a portion of the roofing envelope might occur before an alarm is tripped. Such a system is sold under the trademark DETEC.

Most electronic leak detection systems for roofing and waterproofing utilize the ability of the roofing or waterproofing membrane to resist the passage of electrical current through the membrane. In theory, this property electrically isolates the sensors positioned on one side of the membrane from the voltage produced by the same leak detection system on the other side of the membrane. When the membrane is breached and water flows from one side to the other, the circuit between the side with the voltage and the side with the sensors is closed, allowing the sensor to detect the voltage, thus theoretically allowing the leak detection processor connected to the sensors to determine that a leak has occurred and where that leak is coming from. Again in theory, electrically non-conductive membranes would show no voltage on the sensor side of the membrane until a breach occurred, at which time the voltage detected would be sufficiently large that the system could determine that there was an actual leak occurring and where that leak was located based on triangulation of voltage values from the various sensors.

However, it has become apparent through use of existing leak detection systems, as referenced above, that a significant number of roofing and waterproofing membranes can develop degrees of electrically conductive properties, or already have electrically conductive properties, and that these membranes allow a considerable amount of current to pass through the membrane itself without the membrane being breached. While some membranes are intrinsically conductive, and this is a known property of those membranes, others become conductive over time when immersed in water or soils and chemicals used in planting, such as fertilizers, pesticides that the like. This conductivity can, and often does, interfere with electronic leak detection, providing false positive readings or confounding the system when a leak actually does occur because the membrane is already allowing current to pass through, narrowing the window of what level of voltage would indicate a leak and what level would not indicate a leak. Further, the membranes do not become uniformly conductive, so voltage readings on the side of the membrane to which the sensors are applied can vary greatly, further exacerbating the problem of determining leakage.

Through empirical study of membranes already installed with leak detection in real-world projects, we now know that, if a membrane becomes conductive over time, a small point of contact with an electrode will begin to show a small amount of voltage on the other side of the membrane, while an electrode that has a greater area of contact will produce a larger amount of voltage through the membrane. Further, it is apparent that a conductive mesh or other medium covering the entire surface under the membrane, if energized, can act as one big, overall electrode, and can provide enough voltage through the membrane that readings by the sensors or electrodes on the other side of the membrane become so large that an actual leak, which one would expect to result in a spike in the voltage readings at any electrode near the leak, are nearly undetectable.

U.S. Pat. No. 8,566,051 discloses sensors or electrodes that can be applied to the top surface of the membrane and are used to determine if a grounding condition that would indicate a leak exists. This patent also refers to a conductive loop that forms a "pool" of electrical tension on the top surface of the membrane, and a mesh or conductive medium below the membrane that is grounded to the structure or earth so that the current can flow through a breach in the membrane to ground, and the voltage measured on the surface by the electrodes decreases as the distance to the breach decreases.

Prior art also discloses that the mesh or conductive medium under the membrane, if not grounded to the structure, can be energized and voltages can be read manually or by what is known as the two-pole method as disclosed in U.S. Pat. No. 4,565,965 to Geesen, for example. It has been found, however, that a conductive membrane can confound these manual methods. Again, this is because the detected voltages have higher readings, thus narrowing the window of discovery for the even higher voltages that emanate from a breach in the membrane. In addition, detected voltages can also become irregular from point to point because conductivity of the membrane can vary considerably.

It is therefore advantageous to develop a method that can measure actual leakage and breaches in any part of the membrane with as little interference as possible from the current that is already flowing through the membrane. Current may be already flowing through the membrane, if, for example, the membrane is conductive or becomes conductive when in service, or has areas of differing conductivity.

SUMMARY OF THE INVENTION

The present invention is a method for detecting and locating leaks in a roofing membrane and a system for the same.

In its most basic form, the steps of the present method include first, disposing a conductive medium beneath the membrane being tested for leaks; second, disposing at least one emitting electrode on top of the membrane; third, connecting the emitting electrode to a first side of a power supply; fourth, connecting the conductive mesh to a second side of the power supply; fifth, activating one of the at least one emitting electrode; sixth, measuring the current returned to the power supply with a voltmeter; seventh, determining the mean net voltage; eighth, disconnecting the conductive mesh from the power supply; ninth, disposing at least one reference electrode on top of the membrane; tenth, connecting the at least one reference electrode to the second side of the power supply; eleventh, activating each of the at least one emitting electrodes in turn; twelfth, measuring the current returned to the power supply with a voltmeter; thirteenth, determining the mean reference voltage; and fourteenth, determining whether the mean net voltage is greater than or equal to the mean reference voltage. It is preferred that the first side of the power supply is the positive side and the second side of the power supply is the negative side. It is understood, however, that in some embodiments, these polarities may be reversed.

In its most basic form, the system of the present invention includes a conductive mesh disposed beneath the membrane to be tested for leaks; a power supply with positive and negative sides; at least one emitting electrode disposed on top of the membrane, where emitting electrodes are connected to the positive side of power supply; at least one reference electrode disposed on top of the membrane; and a voltmeter that measures return current to the power supply, where the conductive mesh and the reference electrode are alternately connected to the negative side of the power supply. The conductive mesh may be any relatively flat conductive mesh or medium commonly used in the art, such as that disclosed in the prior art and in the inventor's patents and co-pending patent applications incorporated by reference. The system may also include at least a first non-conductive material disposed between the emitting electrode and the membrane. The power supply activates the emitting electrode with a known voltage of no more than 50 volts DC. The reference electrode is preferably disposed equidistant from at least three of the emitting electrodes.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 5A-5F are side diagrams illustrating various ways in which the emitting electrode of the present invention may be placed on top of the membrane surface.

DETAILED DESCRIPTION

Figure 1A:
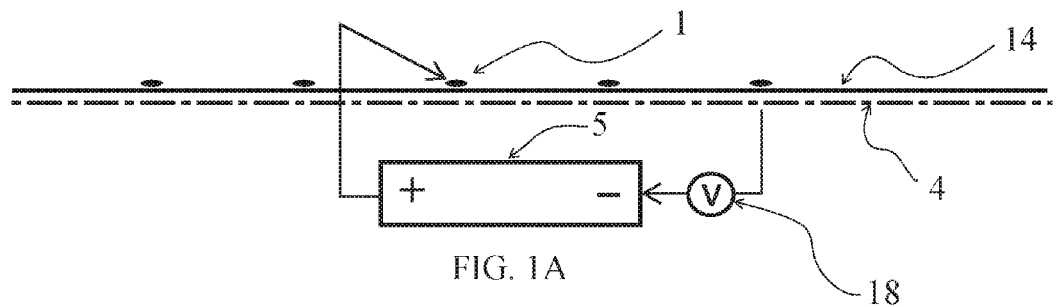
FIG. 1A is a diagram of a system of the present invention in use with an unbreached membrane and an emitting electrode.

The steps of the present method are illustrated in FIGS. 1A-6. In its most basic form, the steps of the present method include first, disposing a conductive mesh 4 beneath the membrane 14 being tested for leaks; second, disposing at least one emitting electrode 1 on top of the membrane 14; third, connecting the emitting electrode 1 to the positive side of a power supply 5, fourth, connecting the conductive mesh 4 to the negative side of the power supply 5; fifth, activating one of the at least one emitting electrode 1; sixth, measuring the current returned to the power supply 5 with a voltmeter 18; seventh, determining the mean net voltage; eighth, disconnecting the conductive mesh 4 from the power supply 5; ninth, disposing at least one reference electrode 6 on top of the membrane 14; tenth, connecting the at least one reference electrode 6 to the negative side of the power supply 5; eleventh, activating each of the at least one emitting electrode 1 in turn; twelfth, measuring the current returned to the power supply with a voltmeter 18; thirteenth, determining the mean reference voltage; and fourteenth, determining whether the mean net voltage is greater than or equal to the mean reference voltage. Each of these steps will be addressed subsequently, in the particular, with reference to the FIGS.

In FIGS. 1A-4B, membrane 14 is intrinsically conductive or has become conductive in service. That is to say, a considerable amount of current may pass through the membrane 14, even when the membrane 14 is not breached. In FIGS. 1A-2C, membrane 14 is not breached. In FIGS. 3A-4B, membrane 14 has breach 17.

As shown most clearly in FIGS. 1A, 2A, 3A, and 4A, conductive mesh 4 is disposed beneath membrane 14, as required by the first step of the method of the present invention. This step is commonly performed during roof installation.

Figure 1B:
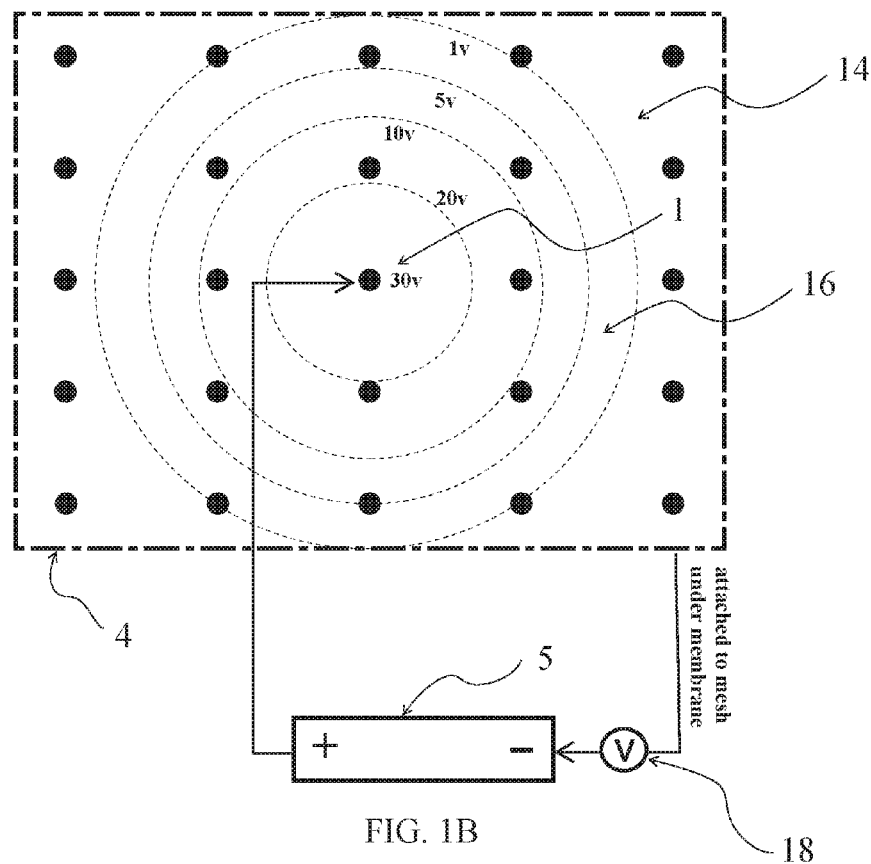
FIG. 1B is a plan diagram of the system shown in FIG. 1A.
Figure 2A:
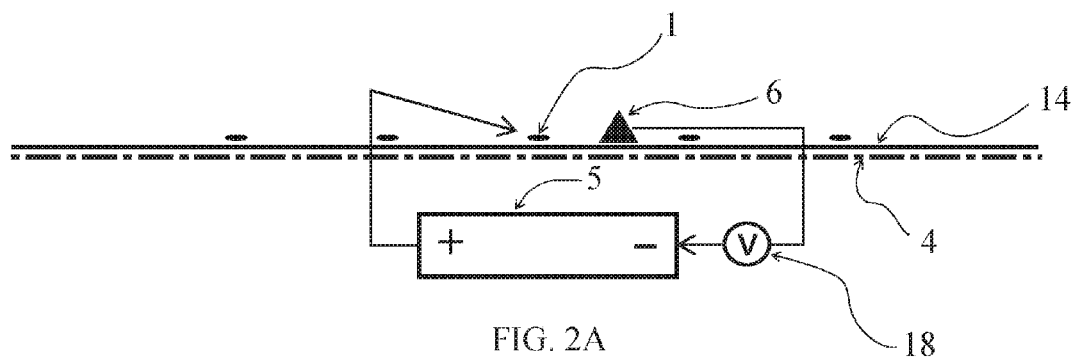
FIG. 2A is a diagram of a system of the present invention in use with an unbreached membrane, an emitting electrode, and a reference electrode.
Figure 2B:
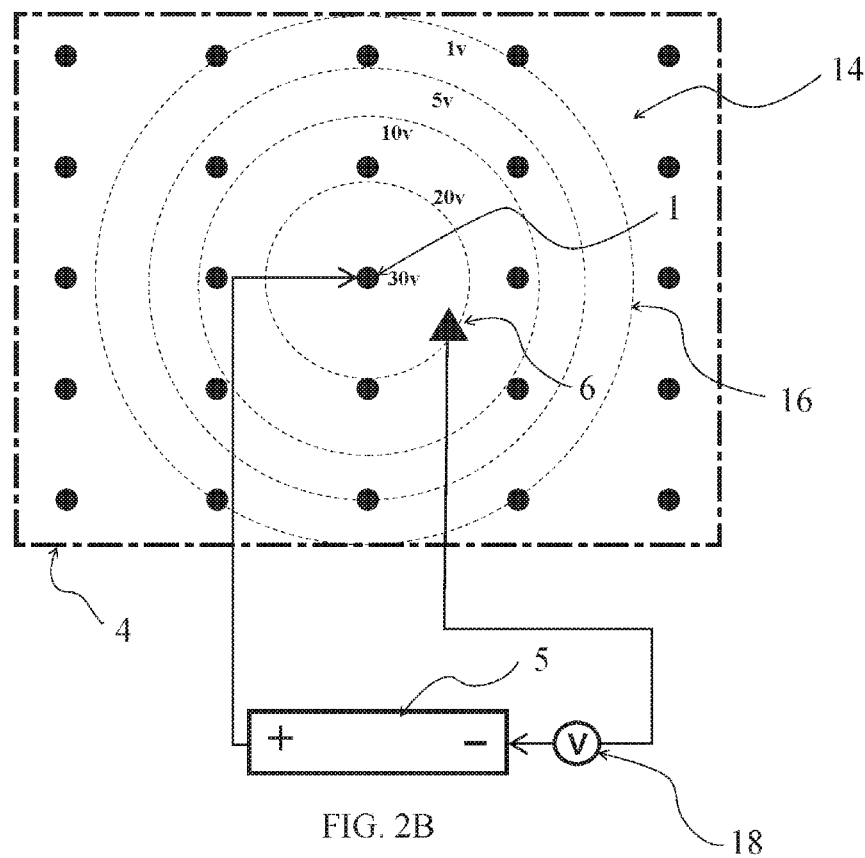
FIG. 2B is a plan diagram of the system shown in FIG. 2A.
Figure 3A:
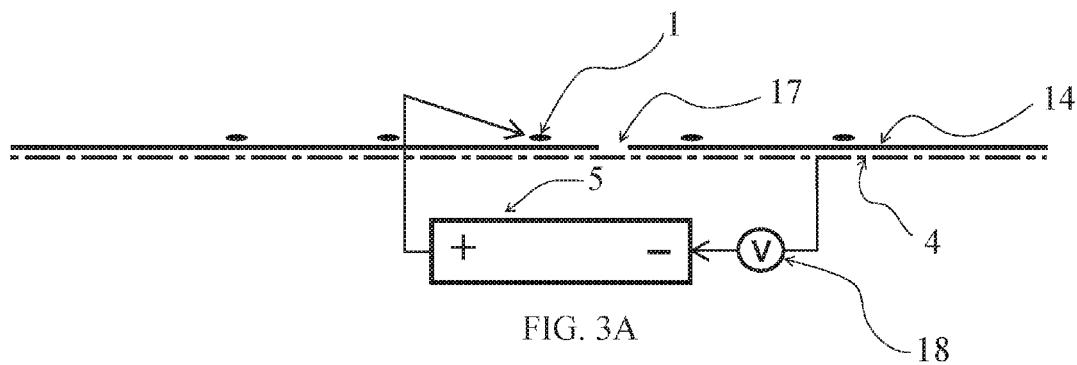
FIG. 3A is a diagram of a system of the present invention in use with a breached membrane and an emitting electrode only.

Also as shown in FIGS. 1A, 1B, 2A, 2B, 3A, 3B, and 4A, emitting electrode 1 is disposed on top of membrane 14, as required by the second step of the method of the present invention. As shown in FIGS. 1A, 2A, and 3A, emitting electrodes 1 are referenced to the positive side of power supply 5, as required by the third step of the method of the present invention. Power supply 5 activates an emitting electrode 1. As discussed in more detail below with reference to FIGS. 5B-5E, it is preferable to make the contact surface area of the emitting electrode 1 with the membrane 14 as small as possible.

Figure 1C:
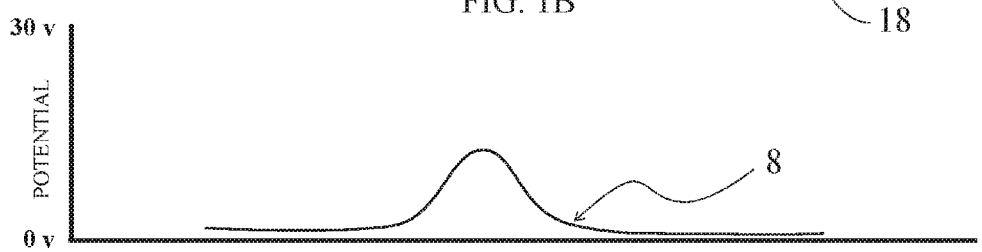
FIG. 1C is a graph of the voltage obtained by the voltmeter included in the system shown in FIGS. 1A and 1B.

As shown in FIG. 1B, emitting electrode 1 is activated by power supply 5, as required by the fifth step of the method of the present invention. It is preferred that power supply 5 provide a known voltage of up to 50 volts DC to emitting electrodes 1 during this step. Dotted-line circles 16 describe the attenuation and decay of the voltage as it travels further from the activated emitting electrode 1. According to the sixth step of the method of the present invention, the current returning to power supply 5 is measured by voltmeter 18. Voltmeter 18 may read voltage, ohms, amps, or any other measure commonly used in the art. FIG. 1C shows graph 8, which describes the voltage from conductive mesh 4 when the emitting electrode 1 is energized and the current flows through the membrane 14 that has not been breached, but is conductive. Graph 8 could easily be mistaken for a leak indication. It is preferred that the sixth step of measuring the voltage occur over a period of time, rather than instantaneously with the initial activation of emitting electrode 1. The emitting electrode 1 remains activated over a period of time and voltage is measured throughout this time. The period of time is preferably between one second and one minute, but may be of longer duration. Because the system relies on calculating the mean of the measurements over a certain period of time that is seconds or minutes, the data acquired from this process is reliable and does not cause false or missed alerts even if the voltage varies from time to time at the same point. The preferred period of time will vary from building to building and system to system, but is usually one to two seconds. The preferred period of time will vary based on the ambient voltage of the building, and whether that ambient voltage pulses or is steady.

Figure 6:
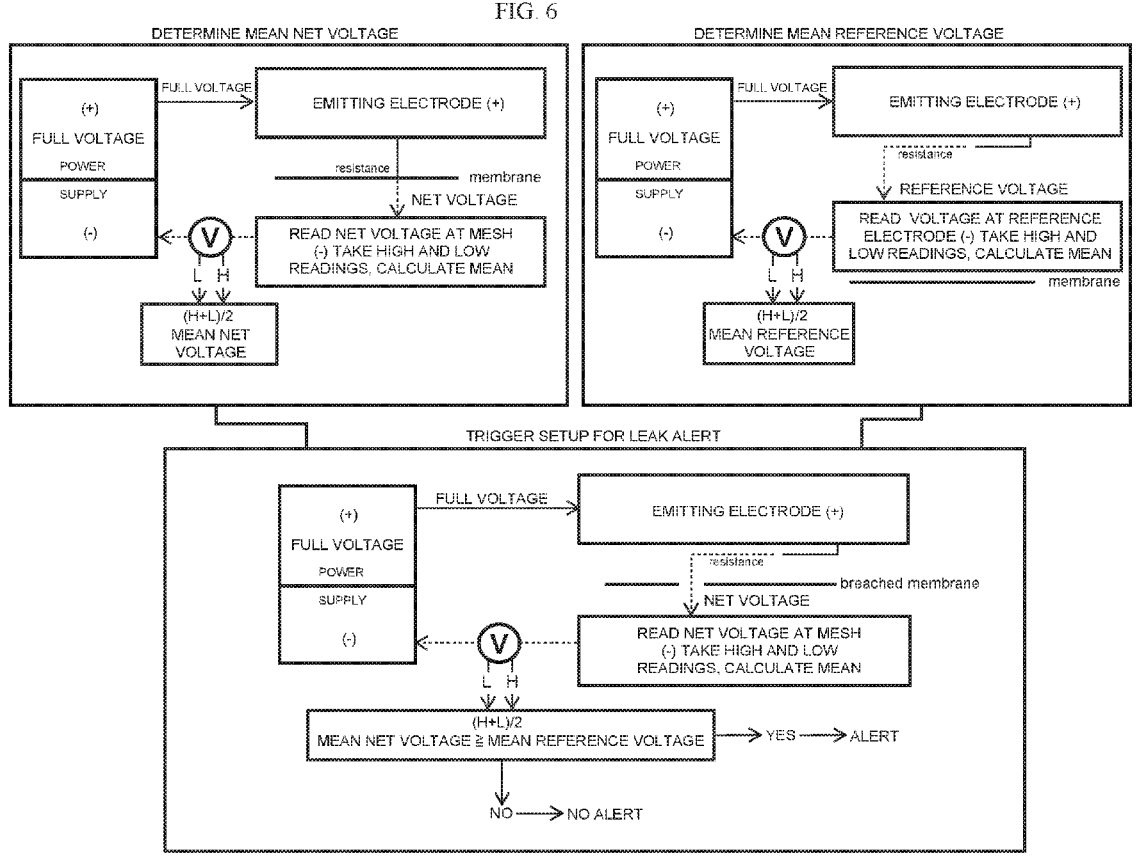
FIG. 6 is a flow chart demonstrating the method of the present invention.

The seventh step of determining the mean net voltage is shown in FIG. 6. The preferred means for affecting this step are to determine the highest and lowest voltage readings determined during the sixth step. The preferred mean net voltage is the difference between the highest and lowest voltage readings, divided by two. Although this is the preferred calculation of the mean net voltage, calculations thereof may include any other statistical methods that can be applied to the voltage readings. The mean net voltage may also be, for example, a time-weighted net value, which depends on how much time voltage remains at one level or another during the measurement cycle, or a calculation of the area under the curve of the graph of the voltage versus time that voltage is read. Standard deviation and other statistical methods may be applied depending on the situation. Each of these possible calculations are understood to be included in the term "mean net voltage" as used herein.

The change between FIGS. 1A and 1B versus FIGS. 2A and 2B illustrates the eighth through tenth steps of the method of the present invention of disconnecting the conductive mesh 4 from the power supply 5; disposing at least one reference electrode 6 on top of the membrane 14; and connecting the at least one reference electrode 6 to the negative side of the power supply 5, respectively. Unlike emitting electrodes 1, which are powered by power supply 5 and therefore emit voltage, reference electrodes 6 only listen. It is preferred that the at least one reference electrode 6 is disposed equidistant from at least three emitting electrodes 1. As shown in FIG. 2B, reference electrode 6 is positioned equidistant from four emitting electrodes 1. This position is the furthest possible point from any of the emitting electrodes 1 being considered, but other positions and distances from the emitting electrodes 1 may also be used.

Figure 2C:
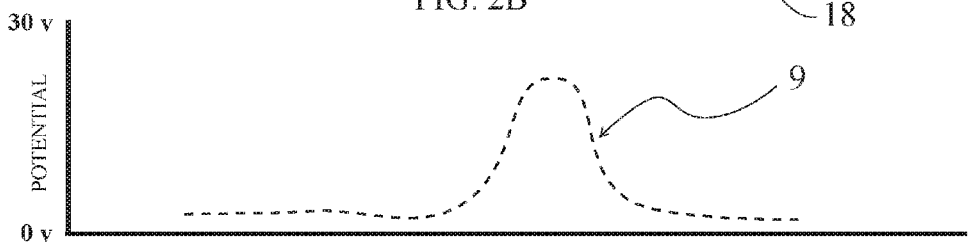
FIG. 2C is a graph of the voltage obtained by the voltmeter included in the system shown in FIGS. 2A and 2B.

The eleventh and twelfth steps of activating each of the at least one emitting electrode 1 in turn and measuring the current returned to the power supply 5 with a voltmeter 18 are also shown in FIGS. 2A-2C. These eleventh and twelfth steps are similar to the fifth and sixth steps of the method illustrated in FIGS. 1A and 1B, and discussed above. Specifically, in the preferred method, the power supply 5 provides a known voltage of up to 50 volts DC to the emitting electrode 1 and the voltage readings occur over a period of time. As such the voltage the dotted-line circles 16 describing the attenuation and decay of the voltage as it travels further from the activated emitting electrode 1 is the same. Because the negative side of power supply 5 is now connected to reference electrode 6, rather than conductive mesh 4, however, voltage meter 18 now measures the voltage obtained from reference electrode 6 when the emitting electrode 1 is activated and current flows across membrane 14. This voltage is shown as dashed-line graph 9 in FIG. 2C.

Figure 3B:
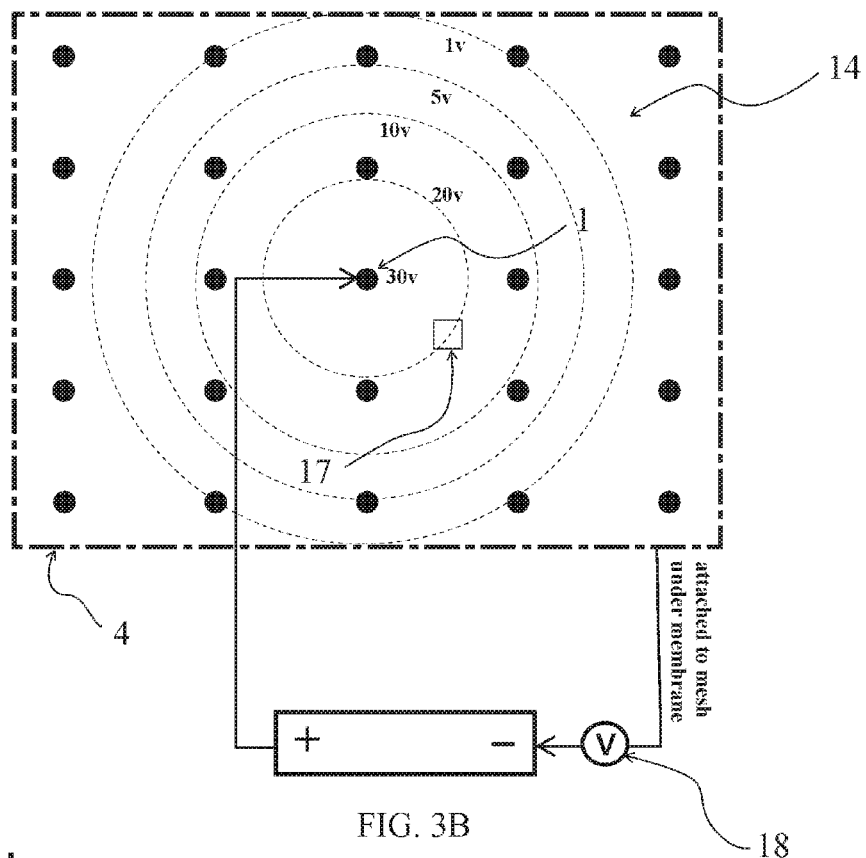
FIG. 3B is a plan diagram of the system shown in FIG. 3A.
Figure 3C:
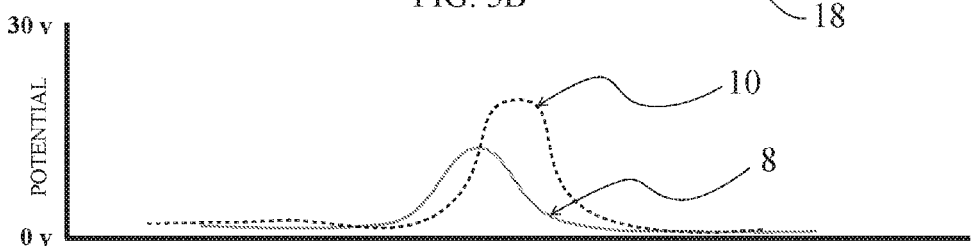
FIG. 3C is a graph of the voltage obtained by the voltmeter included in the system shown in FIGS. 3A and 3B.

The reference electrode 6 receives the current from the emitting electrodes 1, less the attenuation and resistance from the water on the surface membrane 14, and references the same side of the power supply 5 that the conductive mesh 4 referenced in the absence of reference electrode 6. As such, the reference electrodes 6 read similar to what the conductive mesh 4 would read if the membrane 14 were breached at the place where the reference electrode 6 is positioned, and the conductive mesh 4 were contacted by water from the membrane surface 14 through such a breach. This phenomena is illustrated in FIGS. 3A-3C that shows exactly the same scenario as FIGS. 2A-2C, except that in FIGS. 3A and 3B, membrane 14 has breach 17 at the same place where reference electrode 6 was placed in FIGS. 2A and 2B. Dotted-line graph 10, shown in FIG. 3C represents the voltage obtained from breach 17 in membrane 14 when the emitting electrode 1 is energized and current flows across membrane 14. Comparing dashed-line graph 9 in FIG. 2C and dotted-line graph 10 in FIG. 3C, they are the same.

Again, similar to the seventh step of determining the mean net voltage, the thirteenth step of determining the mean reference voltage is shown in FIG. 6. Although many statistical methods may be used to determine the mean reference voltage, as described above, the preferred method is to calculate the difference between the highest and lowest voltage readings as provided by the twelfth step, and divide the difference by two.

The final fourteenth step is determining whether the mean net voltage is greater than or equal to the mean reference voltage. The voltage obtained from reference electrode 6, illustrated by graph 9, will remain constant whether or not membrane 14 is breached. Comparing graph 9 in FIG. 2C with graph 8 in FIG. 1C, it is clear that in the absence of breach 17, the mean net voltage is less than the mean reference voltage, indicating the absence of a breach. In the presence of breach 17, on the other hand, as shown in FIGS. 3A-3B, the voltage measured from emitting electrode 1 is illustrated by the dual graphs 8, for the emitting electrode 1, and 10 for the breach 17. This combination of graphs 8 and 10 represents a greater overall voltage reading than graph 8 alone. In other words, when the fifth through seventh steps of the method of the present invention, activating one of the at least one emitting electrode 1; measuring the current returned to the power supply 5 with a voltmeter 18; and determining the mean net voltage are performed in the presence of breach 17, the mean net voltage is greater than or equal to the mean reference voltage determined from the tenth through thirteenth steps of connecting the at least one reference electrode 6 to the negative side of the power supply 5; activating each of the at least one emitting electrode 1 in turn; measuring the current returned to the power supply with a voltmeter; and determining the mean reference voltage. If the leak 17 is closer to any emitting electrode 1, the voltage will read even higher than the voltage at the reference electrode 6 and will be determined to be a leak. In preferred embodiments of the method of the present invention, the additional step of manually moving the reference electrode 6 is also included. Reference electrodes 6 may be moved manually at any point on the membrane surface 14 to which is applied the emitting electrodes 1 to obtain further readings that justify or modify findings, either before or after the roofing or waterproofing membrane 14 is covered with overburden.

In preferred embodiments of the method, an additional step of causing a leak alert to trigger when the mean net voltage is greater than or equal to the mean reference voltage is also included. This alert may be built into the monitoring system by any means commonly used in the art. It should be noted that there are likely variations in voltage measurements through the membrane 14. The voltage reading at the conductive mesh 4 for any emitting electrode 1 at the edge of a roof reads lower because of the decrease in the available surface area of the membrane 14 and mesh 4, for example. Because of such variations, the mean net voltage is measured and logged at each emitting electrode 1 and, based on these findings and the data obtained from the reference electrodes 6, a factor can be calculated and applied to each emitting electrode 1 to inform the system when the mean reference voltage of the membrane 14 in any area of the surface has been exceeded by the mean net voltage. This factor allows for readings that are 10-40% above the initially established mean net voltage and have been found to be uniform across the entire membrane.

Figure 4A:
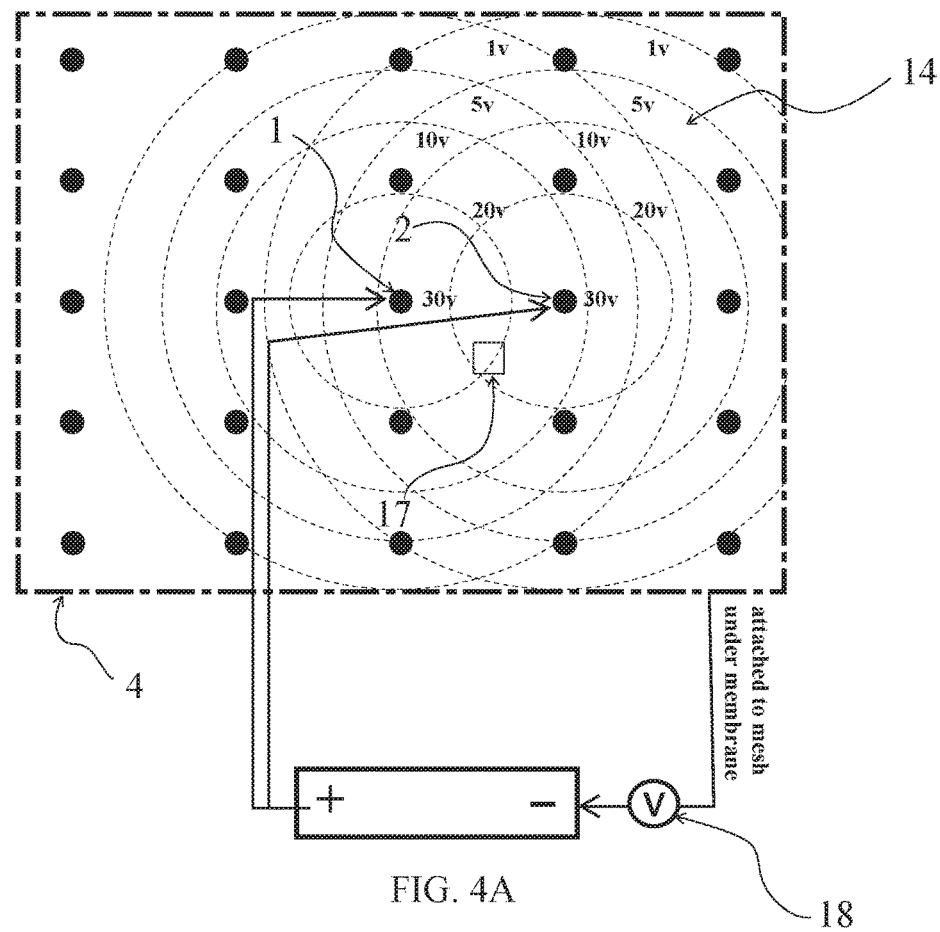
FIG. 4A is a plan diagram of a system of the present invention in use with a breached membrane and at least two emitting electrodes.
Figure 4B:
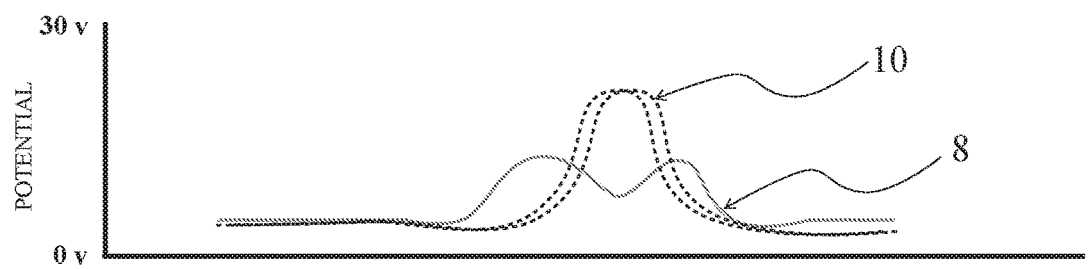
FIG. 4B is a graph of the voltage obtained by the voltmeter included in the system shown in FIG. 4A.

Now referring to FIGS. 4A and 4B, the scenario is as in FIGS. 3A and 3B, where membrane 14 has breach 17. FIGS. 4A and 4B represent a preferred fifteenth step of the method of the present invention: for each emitting electrode disposed on top of the membrane, repeating the steps of connecting the conductive mesh to the negative side of the power supply; activating one of the at least one emitting electrode; measuring the current returned to the power supply with a voltmeter; and determining the mean net voltage.

A first emitting electrode 1 is activated by power supply 5. Current then flows from emitting electrode 1 into breach 17 and contacts conductive mesh 4, which references the negative side of power supply 5. When return current is measured by voltmeter 18, the graphic result is the left sides of the graphs 8 and 10 shown in FIG. 4B. The first emitting electrode 1 is then deactivated. A second emitting electrode 2 is then activated. Current flows from emitting electrode 2 into breach 17 and contacts conductive mesh 4. When return current is measured, the graphic result is the right lobes of the graphs 8 and 10 shown in FIG. 4B. As each emitting electrode is activated in turn, the location of breach 17 will be indicated by such graphs. As mentioned, the method of the present invention is performed when a membrane 14 is intrinsically conductive or becomes conductive in service. It is advantageous to activate only one emitting electrode at a time when performing the leak detection in these conditions. This is so that the membrane 14 does not become overloaded with voltage from live leak detection wires, wide-area meshes or electrode arrays that are all switched on at once, and can dissipate the point electrical charge over a large area, thus minimizing current that passes through the membrane.

Now referring to FIGS. 5A-5F, various ways in which emitting electrode 1 is contacted with membrane 14 are illustrated. FIG. 5A illustrates basic contact with emitting electrode 1 disposed directly on top of membrane 14. It is preferable to make the contact surface area of the emitting electrode 1 with the membrane 14 as small as possible. One way to do this is to make the emitting electrode contact area extremely small, such as by using just the tip of a wire. Although possible, this option is not practical in an actual construction activity. A better way is to use an emitting electrode 1 with a surface area of 30 square inches or less. Such an emitting electrode 1 is easily handled and identified in the field. As shown in FIGS. 5B-5E, on the other hand, the surface of the membrane 14 need not be contacted at all by the emitting electrode 1. Rather, the emitting electrode 1 can be some distance away from the membrane surface 14. This distancing may be effected by including at least one layer of non-conductive material 21 between membrane 14 and emitting electrode 1. An example of non-conductive material 21 that may be used for this purpose is plastic or a pad of non-conductive material. The non-conductive material 21 may be bonded to the emitting electrode 1 and placed on top of membrane 14, as shown in FIG. 5B. Or, as shown in FIG. 5C, the non-conductive material 21 may be simply placed between the top surface of membrane 14 and emitting electrode 1. In FIGS. 5D and 5E, the emitting electrode 1 is distanced still further from the membrane 14, by adding an additional layer of non-conductive material 22 between the emitting electrode 1 and the membrane 14, in addition to non-conductive material 21. In FIG. 5F, the emitting electrode 1 is positioned on top of the non-conductive material 22 only, with no further electrical insulating layer 21 as shown in FIGS. 5D and 5E. Non-conductive material 22 is preferably plastic mesh or netting, such as the type of material used in drainage layers in standard construction, which is already normally positioned as the next layer on the surface of the membrane 14, especially in ballasted roofing and waterproofing systems. Non-conductive material 22 may be disposed between membrane 14 and non-conductive material 21, or between non-conductive material 21 and emitting electrode 1. Using a non-conductive membrane 21, as described, allows the current that flows through any moisture on top of the membrane 14 to be relatively more prominent. This lessens the impact of the electrical current that flows directly through the membrane 14. This is an important aspect because leakage 17 in a membrane 14 is almost always not at the position of an emitting electrode 1, so it is the water that flows over the membrane 14 that actually conducts the electrical signal from the emitting electrode 1 to the breach 17 in the membrane 14 to the conductive mesh underneath 4.

Now referring to FIG. 6, a flow chart demonstrating the steps of the method of the present invention are provided. FIG. 6 is to be read in conjunction with FIGS. 1A-4B. In the top left box, the mean net voltage is determined. Emitting electrode 1 is referenced to the positive (+) side of the power supply 5 and disposed on top of the membrane 14. Conductive mesh 4 is disposed beneath membrane 14 and is referenced to the negative (−) side of the power supply 5. Voltmeter 18 is disposed so as to measure the current returned to the power supply 5. In this top left box, membrane 14 is not breached. When emitting electrode 1 is activated by power supply 5, the mean net voltage is calculated by adding the high and low voltage readings and dividing the sum by two. Membrane 14, allows electricity through, but has resistance so that the voltage on top of membrane 14 is greater than the voltage read below membrane 14. This is indicated by a solid line in the arrow above membrane 14 and a dashed line below it.

In the top right box, the mean reference voltage is determined. Again, emitting electrode 1 is referenced to the positive (+) side of the power supply 5 and is disposed on top of the membrane 14. Reference electrode 6 is also disposed on top of the membrane 14, but is referenced to the negative (−) side of the power supply 5. Conductive mesh 4 is no longer referenced to the power supply 5. Membrane 14 is not breached. When emitting electrode 1 is activated by power supply 5, the mean reference voltage is calculated by adding the high and low voltage readings and dividing the sum by two. Reference electrode 6 is offset from emitting electrode 1 on top of membrane 14, so resistance of the water on membrane 14 reduces the voltage detected by reference electrode 6. As with the top left box, the solid part of the arrow represents the greater voltage at emitting electrode 1 and the dashed part of the arrow represents the reduced voltage, which runs through to voltmeter 18 that reads the lower voltage.

In the bottom box, membrane 14 is breached. The setup of the system and the method steps are as described above with reference to the top right box. In this case, however, the presence of breach 17 will cause voltmeter 18 to read higher readings during the activation of the emitting electrode 1. This, in turn, will make the mean net voltage higher than that which was calculated in the top right box with no breach 17 in membrane 14. As shown at the bottom of the bottom box, the mean net voltage and the mean reference voltage are compared. If the mean net voltage is greater than or equal to the mean reference voltage, then an alert is triggered, indicating a leak. In this case, with breach 17 in membrane 14, the mean net voltage will be greater than or equal to the mean reference voltage and an alert will be triggered. If the mean net voltage were less than the mean reference voltage, on the other hand, then no alert would be triggered.

The system of the present invention is illustrated most clearly in FIGS. 1A-4B. The system includes conductive mesh 4 disposed beneath membrane 14; power supply 5 with positive and negative sides; at least one emitting electrode 1 disposed on top of membrane 14, where emitting electrodes 1 are connected to the positive side of power supply 5; at least one reference electrode 6 disposed on top of membrane 14; and a voltmeter 18 that measures return current to power supply 5, where conductive mesh 4 and reference electrode 6 are alternately connected to the negative side of power supply 5. The system may also include at least a first non-conductive material disposed between the emitting electrode and the membrane. The power supply activates the emitting electrode with a known voltage of no more than 50 volts DC. The reference electrode is preferably disposed equidistant from at least three of the emitting electrodes.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A method for detecting and locating leaks in a membrane, said method comprising the steps of:
    disposing a conductive mesh beneath the membrane;
    disposing at least one emitting electrode on top of the membrane;
    connecting the at least one emitting electrode to a first side of a power supply;
    connecting the conductive mesh to second side of the power supply;
    activating one of the at least one emitting electrodes;
    measuring the current returned to the power supply with a voltmeter;
    determining the mean net voltage;
    disconnecting the conductive mesh from the power supply;
    disposing at least one reference electrode on top of the membrane;
    connecting the at least one reference electrode to the second side of the power supply;
    activating one of the at least one emitting electrodes;
    measuring the current returned to the power supply with a voltmeter;
    determining the mean reference voltage; and
    determining whether the mean net voltage is greater than or equal to the mean reference voltage.

2. The method as claimed in claim 1, wherein the first side of the power supply is the positive side of the power supply and the second side of the power supply is the negative side of the power supply.

3. The method as claimed in claim 1, wherein said step of activating at least one emitting electrode that immediately follows said step of connecting the at least one reference electrode to the second side of the power supply comprises activating the at least one emitting electrode that was activated in said step of activating one of the at least one emitting electrode that immediately followed said step of disconnecting the conductive mesh to a negative side of the power supply.

4. The method as claimed in claim 1, further comprising the step of, for each of the at least one emitting electrode, repeating said steps of:
 connecting the conductive mesh to the second side of the power supply;
 activating one of the at least one emitting electrodes;
 measuring the current returned to the power supply with a voltmeter; and
 determining the mean net voltage.

5. The method as claimed in claim 4, further comprising the step of disposing the at least one reference electrode at a different location on top of the membrane and repeating said steps of:
 disconnecting the conductive mesh from the power supply;
 connecting the at least one reference electrode to the second side of the power supply;
 activating the at least one emitting electrode that was activated in a last performance of said step of activating one of the at least one emitting electrode;
 measuring the current returned to the power supply with a voltmeter; and
 determining the mean reference voltage.

6. The method as claimed in claim 1, wherein said steps of measuring the current returned to the power supply comprise measuring the current for no less than one second and no more than one minute.

7. The method as claimed in claim 1, wherein said steps of activating the at least one emitting electrode comprises applying a known voltage of no more than 50 volts DC to the at least one emitting electrode.

8. The method as claimed in claim 1, wherein said step of disposing at least one reference electrode on top of the membrane comprises disposing at least one reference electrode such that the at least one reference electrode is equidistant from at least three emitting electrodes.

9. The method as claimed in claim 1, further comprising the step of causing a leak alert to trigger when the mean net voltage is greater than or equal to the mean reference voltage.

10. The method as claimed in claim 1, further comprising the step of disposing at least a first non-conductive material between the at least one emitting electrode and the membrane.

11. The method as claimed in claim 10, wherein said step of disposing at least a first non-conductive material between the at least one emitting electrode and the membrane comprises disposing an electrical insulator between the at least one emitting electrode and the membrane.

12. The method as claimed in claim 11, wherein said step of disposing an electrical insulator between the at least one emitting electrode and the membrane comprises bonding the at least one emitting electrode to the electrical insulator and placing the electrical insulator on top of the membrane.

13. The method as claimed in claim 11, wherein said step of disposing at least a first non-conductive material between the at least one emitting electrode and the membrane further comprises the step of placing a second non-conductive material between the at least one emitting electrode and the membrane.

14. The method as claimed in claim 13, wherein said step of placing a second non-conductive material between the at least one emitting electrode and the membrane comprises one of placing netting between the at least one emitting electrode and the membrane.

15. The method as claimed in claim 13, wherein said step of placing a second non-conductive material between the at least one emitting electrode and the membrane comprises one of the group consisting of placing the second non-conductive material between the at least one emitting electrode and the electrical insulator and placing the second non-conductive material between the electrical insulator and the membrane.

16. The method as claimed in claim 10, wherein said step of disposing at least a first non-conductive material between the at least one emitting electrode and the membrane comprises disposing one of a group consisting of plastic mesh and netting between the at least one emitting electrode and the membrane.

17. The method as claimed in claim 1, wherein said step of determining the mean net voltage comprises adding a highest voltage reading and a lowest voltage reading from said step of measuring the current returned to the power supply that immediately precedes said step of determining the mean net voltage and dividing a resulting sum by two.

18. The method as claimed in claim 1, wherein said step of determining the mean reference voltage comprises adding a highest voltage reading and a lowest voltage reading from said step of measuring the current returned to the power supply that immediately precedes said step of determining the mean reference voltage and dividing a resulting sum by two.

19. The method as claimed in claim 1, further comprising the step of disposing the at least one reference electrode at a different location on top of the membrane and repeating said steps of:
 disconnecting the conductive mesh from the power supply;
 connecting the at least one reference electrode to the second side of the power supply;
 activating one of the at least one emitting electrodes;
 measuring the current returned to the power supply with a voltmeter; and
 determining the mean reference voltage.

20. A system for detecting and locating leaks in a membrane, comprising:
 a conductive medium disposed beneath the membrane;
 a power supply comprising a positive and a negative side;
 at least one emitting electrode disposed on top of the membrane and connected to said positive side of said power supply, such that said power supply activates said at least one emitting electrode;
 at least one non-conductive material disposed between said at least one emitting electrode and the membrane;
 a voltmeter that measures return current to said power supply; and
 at least one reference electrode disposed on top of the membrane;
 wherein said conductive medium and said at least one reference electrode are alternately connected to said negative side of said power supply.

21. A system for detecting and locating leaks in a membrane, comprising:
- a conductive medium disposed beneath the membrane;
- a power supply comprising a positive and a negative side;
- at least one emitting electrode disposed on top of the membrane and connected to said positive side of said power supply, such that said power supply activates said at least one emitting electrode with a known voltage of no more than 50 volts DC;
- a voltmeter that measures return current to said power supply; and
- at least one reference electrode disposed on top of the membrane;
- wherein said conductive medium and said at least one reference electrode are alternately connected to said negative side of said power supply.

22. A system for detecting and locating leaks in a membrane, comprising:
- a conductive medium disposed beneath the membrane;
- a power supply comprising a positive and a negative side;
- at least one emitting electrode disposed on top of the membrane and connected to said positive side of said power supply, such that said power supply activates said at least one emitting electrode;
- a voltmeter that measures return current to said power supply; and
- at least one reference electrode disposed on top of the membrane and disposed equidistant from at least three of said emitting electrodes;
- wherein said conductive medium and said at least one reference electrode are alternately connected to said negative side of said power supply.

23. A system for detecting and locating leaks in a membrane, comprising:
- a conductive medium disposed beneath the membrane;
- a power supply comprising a positive and a negative side;
- at least one emitting electrode disposed on top of the membrane and connected to said positive side of said power supply, such that said power supply activates said at least one emitting electrode, wherein said at least one emitting electrode comprises a surface area of at least 30 square inches;
- a voltmeter that measures return current to said power supply; and
- at least one reference electrode disposed on top of the membrane;
- wherein said conductive medium and said at least one reference electrode are alternately connected to said negative side of said power supply.

* * * * *